United States Patent

[11] 3,609,206

[72] Inventor Lorne D. McConnell
 Radnor, Pa.
[21] Appl. No. 7,165
[22] Filed Jan. 30, 1970
[45] Patented Sept. 28, 1971
[73] Assignee I-T-E Imperial Corporation
 Philadelphia, Pa.

[54] EVAPORATIVE COOLING SYSTEM FOR INSULATED BUS
6 Claims, 3 Drawing Figs.

[52] U.S. Cl. .................................................. 174/15 C,
 165/105, 174/16 B, 174/37, 174/110 F
[51] Int. Cl. .............................................. H01b 7/34
[50] Field of Search .................................. 174/15, 15
 C, 16, 16 B, DIG. 6, 37, 110.8; 165/105, 45;
 62/514

[56] References Cited
UNITED STATES PATENTS

| | | | |
|---|---|---|---|
| 1,754,314 | 4/1930 | Gay | 174/15 C |
| 1,986,893 | 1/1935 | Hasbrouck et al. | 165/105 X |
| 3,292,016 | 12/1966 | Kafka | 174/15 X |
| 3,409,731 | 11/1968 | Fink et al. | 174/15 |
| 3,453,716 | 7/1969 | Cook | 174/15 UX |
| 3,463,869 | 8/1969 | Cooley et al. | 174/16 X |
| 3,509,266 | 4/1970 | Endacott | 174/15 |
| 3,517,730 | 6/1970 | Wyatt | 165/105 X |

*Primary Examiner*—Lewis H. Myers
*Assistant Examiner*—A. T. Grimley
*Attorney*—Ostrolenk, Faber, Gerb & Soffen

ABSTRACT: The interior of a hollow elongated bus, which is embedded in insulation material, receives a refrigerant which is vaporized by the heat generated by current flow in the bus. A plurality of vapor conductors extend into the bus at longitudinally spaced locations along the bus and are terminated by a condenser.

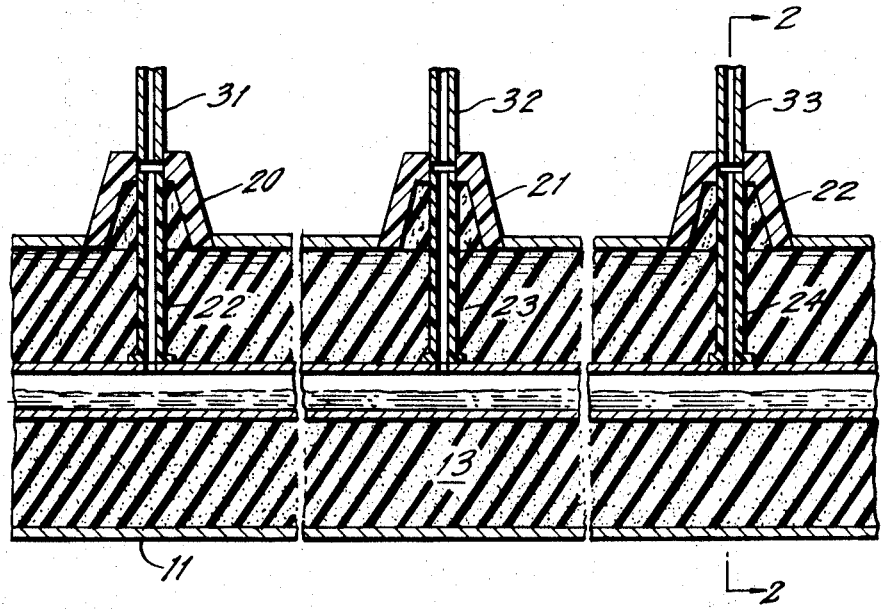
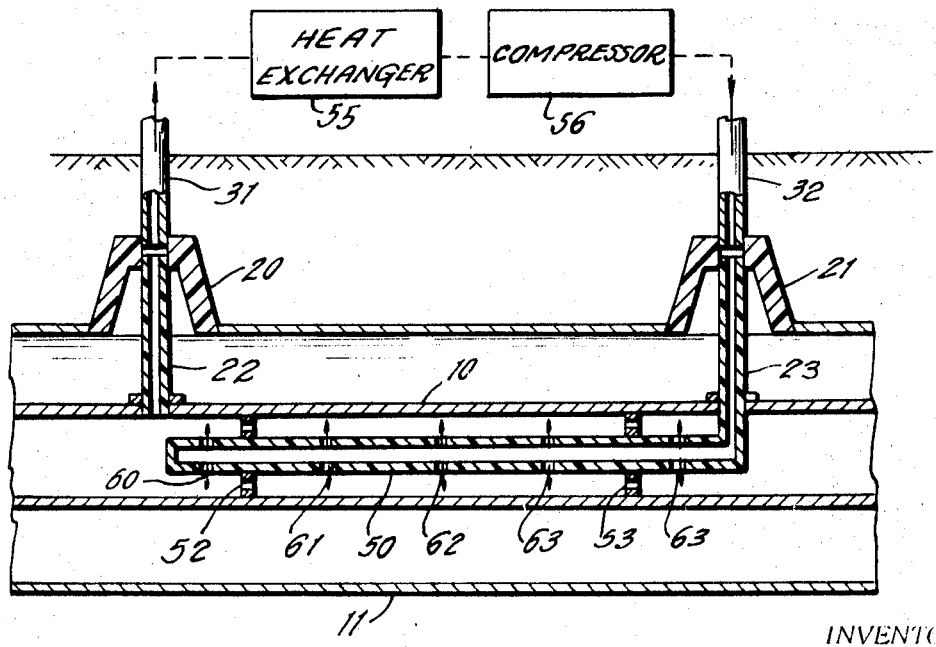

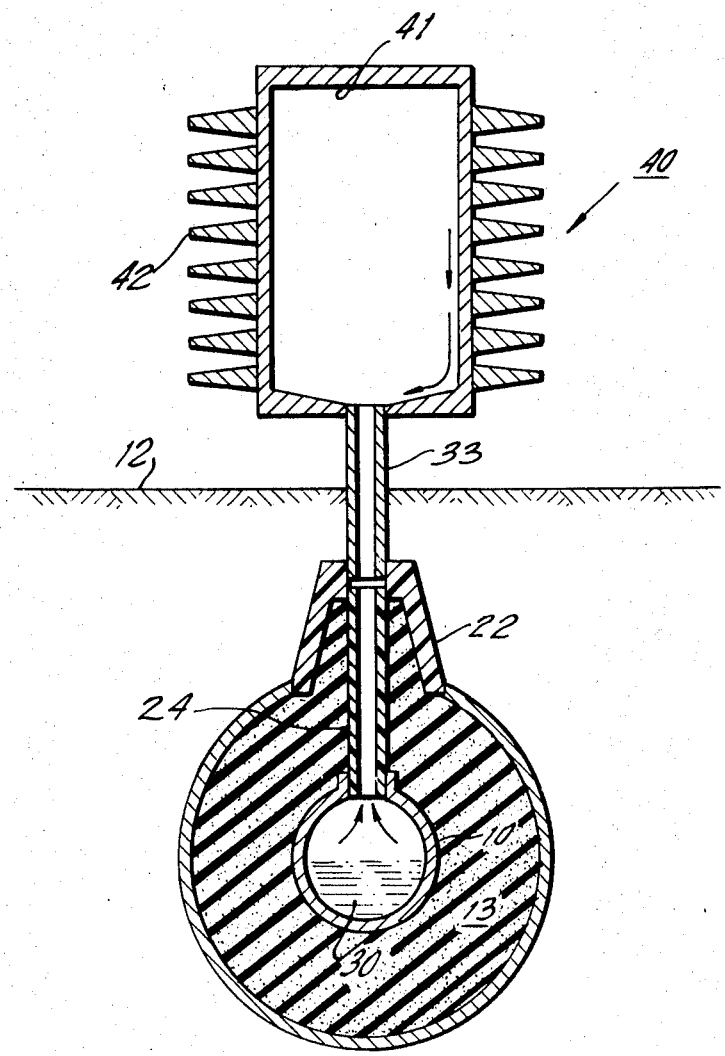

EVAPORATIVE COOLING SYSTEM FOR INSULATED BUS

RELATED APPLICATIONS

My copending application Ser. No. 867,175, filed Oct. 17,1969, entitled "Evaporative Cooling Means for Electrical Power Equipment" now abandoned, shows an evaporative cooling system for cooling the contacts and insulator bushing of a circuit interrupter, using the stud of the insulator bushing as a vapor conductor.

Copending application Ser. No. 31,639 filed Apr. 24, 1970, entitled "Electrical Insulation Products Using Sulfur Hexafluoride Foams," and assigned to the assignee of the present invention, shows a process for producing an insulation foam, using sulfur hexafluoride gas captured in plastic cells and the use of such foam to insulate electrical conductors.

SUMMARY OF THE INVENTION

This invention relates to the cooling of electrical apparatus, and more particularly relates to the use of an evaporative cooking system for cooling an elongated bus which is enclosed in an insulation material.

In accordance with the present invention, a transmission system bus, which may be buried underground, consists of a hollow, elongated conductor which is enclosed by a housing which is filled with a high dielectric gas such as $SF_6$ or is enclosed by a foam formed of $SF_6$ filled cells, made in accordance with the disclosure of application Ser. No. 31,639 (note above). The heat from the bus is then removed by the novel system in which the liquid phase of a refrigerant, such as a Freon gas, is enclosed in the hollow conductor and is thus in intimate contact with the conductor. Thus, the conductor serves as the evaporator chamber of the cooling system A plurality of spaced insulator tubes pass through a suitable entrance bushing and through the bus insulation sheath and into the hollow conductor. A condenser is supported at the outer end of this vapor conductor to condense the refrigerant and return the refrigerant to the hollow bus by gravity. The condenser may be cooled either underground, or above ground, by normal convection, conduction, radiation and forced cooling, or combinations thereof.

Where the transmission line is such that the refrigerant vapor cannot be conducted overhead to the condenser and then returned by gravity, it is possible to employ a suitable wick inside the vapor conductor to employ the capillary-type transfer of condensed liquid as in the so-called "heat pipe". Obviously, such devices could be used throughout the system of the invention regardless of the orientation of the vapor conductors and condensers.

As a further feature of the invention, a full two-pressure refrigeration system could be used with the hollow bus carrying the liquid refrigerant in a separate tube within the conductor. Expansion of the fluid from this tube occurs through suitable nozzles into the interior of the conductor to be cooled. The heated vapor is then conducted to an external compressor and heat exchanger.

BRIEF DESCRIPTION OF THE DRAWINGS.

FIG. 1 shows a longitudinal cross-sectional view of a bus conductor cooled in accordance with the present invention.

FIG. 2 is a cross sectional view of FIG. 1 taken across the section line 2—2 in FIG. 1.

FIG. 3 is a similar to FIG. 1 but shows the use of a full two-pressure cooling system.

DETAILED DESCRIPTION OF PREFERRED EMBODIMENTS

Referring first to FIG. 1, there is shown a typical hollow conductive bus 10 which is supported within housing 11. Housing 11 may be conductive material or of insulation material and provided with a so-called ground shield. Conductor 10 may be supported within housing 11 by standard disk insulators (not shown), or by a solid foam 13 consisting of a high dielectric gas, such as $SF_6$, captured in closed cells, as shown in copending application Ser. No. 31,639. When bus 10 is insulated by such a foam, and more generally, even if insulated by air, there is a high impedance to the flow of heat to the outer housing 11 and through housing 11 to external atmosphere. This problem is further complicated when the housing 11 is buried under ground level 12, as shown in Figures 1 and 2.

In accordance with the invention, a plurality of evaporative cooling systems are spaced along the bus, with their condensers suitably disposed to efficiently remove heat from the bus. The central bus to be cooled may be further used as a common container for a liquid refrigerant. As shown in Figures 1 and 2, a plurality of entrance bushings 20, 21 and 22 are spaced along the length of housing 11 and are secured to housing 11 in any desired manner. Entrance bushings 20 to 22 each have hollow tubes 23, 24 and 25 extending through housing 11 and through insulation foam 13 and into an opening in conductor 10. Preferably, tubes 22, 23 and 24 are of insulation material. The connection between tubes 20, 21 and 22 and conductor 10 should be sealed. A liquid refrigerant 30, such as a Freon, is then contained within the conductor 10 and fills the conductor to about half its volume. The ratio of refrigerant to conductor volume may be varied, depending upon the maximum expected heating of conductor 10 and the necessary volume of refrigerant per length of bus 10 to insure a supply of vaporizable liquid at this maximum heat input.

Conductive tubes 31, 32 and 33 are then joined to the ends of tubes 22, 23 and 24 respectively, and terminate in suitable condensers shown as condenser 40 for tube 33. Such condensers may be above ground or may be buried. Condenser 40 consists of a conductive body 41 having a plurality of fins 42 thereon. Condenser 40 may have any other suitable form for transmitting heat to surrounding air or soil.

In operation, the liquid refrigerant 30 in conductor 10 is vaporized by the heat of conductor 10. Vapor then flows up the spaced tubes 22, 23 and 24. Once the vapor reaches ground potential at bushings 20, 21 and 22, it may be carried by conductive tubes 31, 32 and 33, respectively, to their respective condensers such as condenser 40. The vapor is cooled and condenses within chamber 41 of condenser 40 and the condensate flows down tubes 22, 23 and 24 by gravity, back to conductor 10. Note that the same tube is used to conduct vapor to the condenser, and then to return the condensate. If desired, a separate return channel could be provided.

If desired, condenser 40 and the other condensers of the system may be buried in the ground above housing 11 if it is not necessary to expose them to ambient atmosphere above ground level.

The novel system described above provides numerous advantages particularly since the coolant system is made independent of the primary insulation system. Thus, the cooling system does not impose design limitations on the gas pressure to be employed if gas insulation is used for foam 13; does not dictate what type gas should be used; and does not influence dielectric stress patterns in the insulation system. Moreover, the cooling system is self-contained and requires no auxiliary power source or pumping. The requisite number of condensers will be disposed along the length of the bus system to obtain a desired temperature gradient along the bus. In particular, they may be located at tap locations and terminal locations of the bus.

If desired, capillary wicks commonly used for "heat pipes" could be incorporated into the tubes 22-24 and 31-33, as well as inside conductor 10, if gravity return of condensate is not available, or if it is desired to reduce temperature differentials along the bus.

A further feature of the present invention is, with auxiliary power present, to form a two-pressure system as shown in Figure 3. Thus, in FIG. 3, a hollow tube 50 is supported within conductor 51 as by support spacers 52 and 53. One end of tube 50 is connected to tube 23, while tube 22 is connected to the interior of conductor 10, as in Figures 1 and 2. Tube 31 is then connected to a heat exchanger 55 and a compressor 56 which compresses the vapor and returns it to tube 32 and thus tube 50. The tube 50 contains a plurality of expansion nozzles, such as nozzles 60 to 64, which expand the fluid from tube 50 into the interior of conductor 10. The expanded fluid will then flow along and absorb heat from conductor 10 and is returned to heat exchanger 55 through tubes 22 and 31.

The embodiments of the invention in which an exclusive privilege or property is claimed are defined as follows:

1. a cooling system for an electrical bus comprising:
   an elongated, hollow bus conductor; thermal insulation material surrounding said bus conductor;
   a vaporizable liquid contained within said elongated, hollow bus conductor; a first hollow tube extending from a region external of said thermal insulation material, through said insulation material and communicating with the interior of said hollow bus conductor; a condenser means; the end of said first hollow tube at said region external of said thermal insulation material connected to said condenser means;
   a second hollow tube extending through said insulation material at a region longitudinally spaced from said first hollow tube along the length of said hollow bus conductor; a second condenser means; the end of said second hollow tube which is in a region external of said thermal insulation material connected to said second condenser means;
   an elongated housing surrounding and radially spaced from said hollow bus conductor, and a high dielectric medium filling the annular space between said elongated housing and said hollow bus conductor; said first and second hollow tubes extending through said elongated housing; and first and second entrance bushings connected between said first and second tubes and said elongated housing.

2. the cooling system of claim 1 wherein said condenser extends above ground level.

3. The cooling system of claim 1 which includes a capillary wick in said first and second hollow tubes.

4. The cooling system of claim 1 wherein said elongated housing is buried below ground level.

5. The cooling system of claim 1 wherein each of said first and second tubes consist of insulation material from at least said first and second entrance bushings to said hollow bus conductor.

6. A cooling system for an electrical bus comprising:
   an elongated, hollow bus conductor; thermal insulation material surrounding said bus conductor;
   a vaporizable liquid contained within said elongated, hollow bus conductor; a first hollow tube extending from a region external of said thermal insulation material, through said insulation material and communicating with the interior of said hollow bus conductor; a condenser means; the end of said first hollow tube at said region external of said thermal insulation material connected to said condenser means;
   an elongated tube disposed within said hollow bus conductor having at least one nozzle therein; and a compressor means connected between said elongated tube and said condenser means, whereby fluid is expanded through said nozzle and into the interior of said hollow bus conductor, and flows to said compressor means through said first hollow tube.